March 27, 1962 R. A. KEARLEY 3,027,245
METHOD OF SEPARATING SODIUM CHROMATE FROM SOLUTION
Filed March 6, 1959
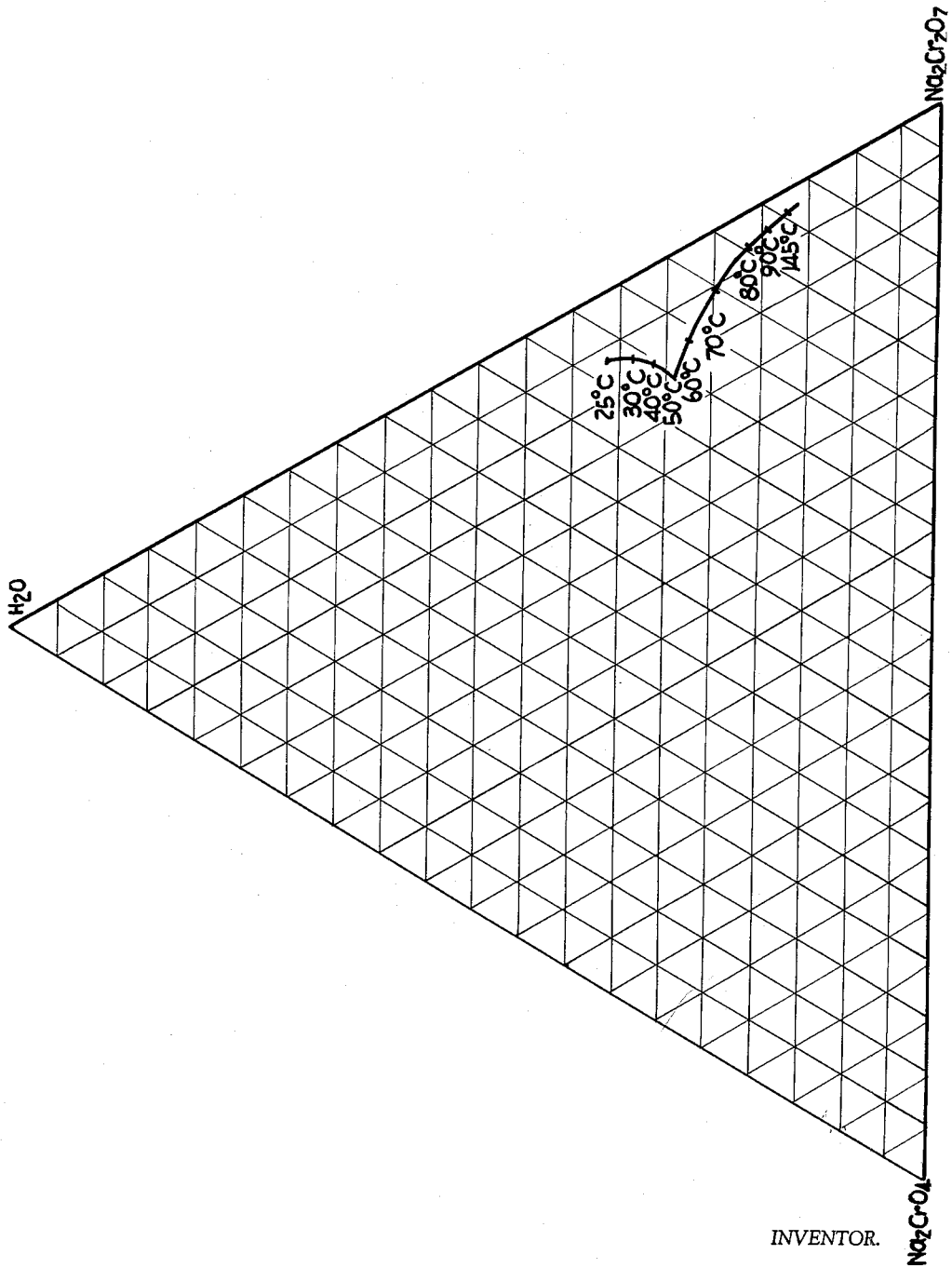
INVENTOR.
ROBERT A. KEARLEY
BY Oscar L. Spencer
ATTORNEY

United States Patent Office 3,027,245
Patented Mar. 27, 1962

3,027,245
METHOD OF SEPARATING SODIUM CHROMATE FROM SOLUTION
Robert A. Kearley, Corpus Christi, Tex., assignor, by mesne assignments, to Pittsburgh Plate Glass Company
Filed Mar. 6, 1959, Ser. No. 797,682
14 Claims. (Cl. 23—296)

This invention relates to a novel method of preparing and recovering sodium chromate and/or sodium dichromate. It is known that sodium chromate may be prepared by calcining a mixture of sodium carbonate and chromite ore and leaching the mixture with water. The resulting leach liquor is a strong, frequently saturated solution of sodium chromate. If sodium dichromate is desired, the solution is treated with acid to convert the chromate to dichromate.

When carbonic acid or carbon dioxide is used for this purpose, the solution thus obtained is a mixture of sodium chromate and sodium dichromate.

According to this invention, it has been found that sodium chromate may be separated from such a solution by concentrating or evaporating the solution until sodium chromate crystals precipitate, thus producing a slurry of the mother liquor having sodium chromate crystals suspended therein. These crystals are then removed, while maintaining the temperature of the suspension above 50° C., and it is also found that sodium dichromate of high purity thereafter can be crystallized by cooling the resulting liquor from the temperature at which the sodium chromate crystals have been removed to a lower temperature. Surprisingly enough, no sodium chromate crystallizes out under these circumstances if the temperature of the resulting mixture is maintained high enough (preferably above about 25° C.). Hence, the dichromate crystals may be readily separated from the mother liquor in high purity. The mother liquor which contains both chromate and sodium dichromate is then treated by any convenient means to recover the values therefrom. Preferably, this mother liquor, which contains about 5 to 15 percent by weight of sodium chromate and 55 to 60 percent by weight of sodium dichromate, is mixed with further leach liquor and the mixture is carbonated to generate further dichromate.

The accompanying diagram shows a curve illustrating the compositions of aqueous solutions of sodium chromate and sodium dichromate which are in equilibrium with both solid sodium chromate and solid sodium dichromate (or a solid hydrate thereof) at various temperatures. Some of the points illustrated in the diagram are as follows:

TABLE I

*Composition of Solution in Equilibrium With Solid Sodium Chromate and Solid Sodium dichromate*

| Temperature | Percent by weight | | |
|---|---|---|---|
| | $Na_2CrO_4$ | $Na_2Cr_2O_7$ | $H_2O$ |
| 25° C | 6 | 57 | 37 |
| 30° C | 8 | 58 | 34 |
| 40° C | 9 | 59 | 32 |
| 50° C | 12 | 59 | 29 |
| 60° C | 8 | 63 | 27 |
| 70° C | 5 | 70 | 25 |
| 80° C | 4 | 75 | 21 |
| 90° C | 3 | 78 | 19 |
| 145° C | 2 | 81 | 17 |

By concentrating any solution containing both sodium chromate and sodium dichromate to a composition to the left of the illustrated curve, sodium chromate precipitates from the solution. For best operation, at least 40 percent (usually not over 95 percent and rarely above 98 percent) of the $CrO_3$ in the solution should be in the form of sodium dichromate, the balance being sodium chromate. Also, it is necessary that the temperature of the suspension from which the sodium chromate crystals are ultimately removed be held at a temperature above 50° C., but rarely above the boiling point of the chromate-dichromate solution. For most purposes, this temperature should be about 70 to 125° C. during removal of the crystallized sodium chromate.

The solutions subjected to treatment are obtained by conventional means by leaching the chromite ore-sodium carbonate calcine and treating the solution with carbon dioxide. Usually, the $CrO_3$ content of such solutions is in excess of about 30–35 percent by weight of sodium chromate. As is described and claimed in United States application for Letters Patent Serial No. 742,172, filed June 16, 1958, now Patent No. 2,931,704, by Howard Hoekje, the disclosure of which is incorporated herein by reference, the stronge chromate solution usually is mixed with a sodium dichromate solution in order to increase the total $CrO_3$ content thereof beyond that corresponding to a saturated sodium chromate solution, and the mixture is reacted with carbon dioxide to convert a portion of the sodium chromate to dichromate. It is found that addition of the dichromate prior to carbonation increases the degree of conversion to dichromate which can be achieved by introduction of carbon dioxide.

The solution after carbonation contains about 40 to 98 percent of its $CrO_3$ in the form of dichromate, the degree of carbonation being controlled in accordance with the magnitude of commercial requirements for sodium dichromate and/or sodium chromate. This solution in which all or substantially all of the $CrO_3$ content thereof is dissolved is heated and water evaporated therefrom until sodium chromate crystallizes. Following this, the crystals of sodium chromate are removed while holding the temperature of the mother liquor above 50° C., preferably above 70° C. In order to prevent contamination of chromate with dichromate, the temperature of the mother liquor should be held at about or even above the temperature at which the crystals have been formed.

After the crystals of sodium chromate have been separated, the mother liquor is cooled to crystallize dichromate. Usually, it is cooled to 40° C. or below. Thereafter, the dichromate crystals are recovered by centrifugation or the like and the mother liquor is mixed with further leach liquor containing sodium chromate and the mixture is recycled.

The following examples are illustrative:

Example I

A substantially saturated aqueous sodium chromate solution containing about 50 percent by weight of sodium chromate is mixed with an aqueous solution containing about 57 percent by weight of dichromate and 6 percent by weight of sodium chromate. This mixture is used as a feed to a carbonating tower, and the feed thus produced contains about 43.1 percent $CrO_3$ as sodium chromate and dichromate, the sodium chromate concentration being 25 percent by weight. This feed is fed continuously to a tower 13 feet high and one foot in diameter. Carbon dioxide is introduced into the base of the tower more rapidly than it is absorbed, and the unreacted carbon dioxide is collected and recycled.

To initiate the process, the tower is filled with the feed liquor and the liquor is fed to the top of the tower and withdrawn from the bottom of the tower at the rate of 11.1 gallons per hour. Carbon dioxide is introduced into the tower fast enough to establish and maintain a carbon dioxide pressure of 125 pounds per square inch gauge at the top of the tower, using substantially pure carbon dioxide fed into the bottom of the tower. The carbon dioxide which is undissolved is collected from the top of the tower and mixed with enough fresh carbon dioxide to make up for that consumed and the mixture is recycled. The carbon dioxide is fed into the bottom of the tower at the rate of about 200 pounds per hour, and make-up carbon dioxide is added to the recycling carbon dioxide at a rate of 20 pounds per hour. The time of retention of the liquid within the column is about 8.2 hours. The feed of liquor under these conditions is continued over a period of 24 hours, the total $CrO_3$ content of the liquor ranging from 42.8 to 43.0 percent by weight.

The sodium chromate content of the liquor withdrawn from the bottom of the column ranges from 5.7 to 5.0 percent by weight, thus indicating a conversion of 91.5 to 92.6 percent of the chromate to dichromate. The temperature of the column during this period of treatment is maintained at 40° C. at the top thereof and 30° C. at the bottom.

Water is evaporated from the liquor until the mixture contains 18 percent of water. Sodium chromate crystals thus precipitated are separated by centrifuging the liquor while the resulting slurry is held at 90° C. The clear liquor thus obtained is cooled at 40° C. and the sodium dichromate which crystallizes therefrom is separated by centrifuging. The mother liquor containing about 8 percent by weight of sodium chromate and 60 percent by weight of sodium dichromate is mixed with further sodium chromate solution and recycled to the carbonation tower.

Example II

A substantially saturated aqueous sodium chromate solution containing 5,436 pounds of $Na_2CrO_4$ and 5,436 pounds of water is mixed with an aqueous solution containing 969 pounds of $Na_2CrO_4$, 10,362 pounds of $Na_2Cr_2O_7$, and 6,944 pounds of water. This mixture is used as a feed to a carbonating tower, as in Example I, and the product thus produced contains 1,349 pounds of $Na_2CrO_4$, 14,450 pounds of $Na_2Cr_2O_7$, 12,099 pounds of water, and 2,622 pounds of solid sodium bicarbonate. This mixture is filtered to remove the sodium bicarbonate and the filtrate is concentrated by evaporation to produce a solution which contains 1,344 pounds of $Na_2CrO_4$, 14,450 pounds of $Na_2Cr_2O_7$, and 9,682 pounds of water. A portion of the solution containing 380 pounds of $Na_2CrO_4$, 4,088 pounds of $Na_2Cr_2O_7$, and 2,738 pounds of water is withdrawn for processing to recover dichromate. The balance is recycled.

The withdrawn portion is further concentrated by evaporation until the mixture contains 20.3 percent of water. The sodium chromate which has crystallized from solution is separated from the solution by means of a centrifuge, while holding the temperature of the solution at 80° C. Thereafter, the solution is cooled to 40° C. and the resulting sodium dichromate crystals are recovered by passing the crystal slurry thus obtained through a centrifuge maintained at 40° C. These crystals are substantially pure sodium dichromate. The mother liquor which contains sodium dichromate and sodium chromate is recycled to the tower.

Although the present invention has been described with reference to the specific details of certain embodiments, it is not intended that such details shall limit or restrict the scope of the invention except insofar as included in the accompanying claims.

What is claimed:

1. A method of treating an aqueous solution of sodium chromate and sodium dichromate which contains 40 to 98 percent of its $CrO_3$ content as sodium dichromate which comprises concentrating the solution until part of the sodium chromate crystallizes out of solution, and separating the resulting mother liquor from the crystals while holding the temperature of the mother liquor above 50° C.

2. A method of treating an aqueous solution of sodium chromate and sodium dichromate which contains 40 to 98 percent of its $CrO_3$ content as sodium dichromate which comprises concentrating the solution until part of the sodium chromate crystallizes out of solution and separating the resulting mother liquor from the crystals while holding the temperature of the mother liquor above 50° C., then cooling the mother liquor to crystallize out dichromate crystals and produce a second mother liquor which contains sodium chromate and sodium dichromate dissolved therein, and separating the dichromate crystals from the second mother liquor.

3. A method of treating an aqueous solution of sodium chromate and sodium dichromate which contains 40 to 98 percent of its $CrO_3$ content as sodium dichromate which comprises concentrating the solution until part of the sodium chromate crystallizes out of solution and separating the resulting mother liquor from the crystals while holding the temperature of the mother liquor above 50° C., then cooling the mother liquor to crystallize out dichromate crystals and produce a second mother liquor which contains sodium chromate and sodium dichromate dissolved therein, and separating the dichromate crystals from the second mother liquor.

4. A method of treating an aqueous solution of sodium chromate and sodium dichromate which contains 40 to 98 percent of its $CrO_3$ content as sodium dichromate which comprises concentrating the solution until part of the sodium chromate crystallizes out of solution and separating the resulting mother liquor from the crystals while holding the temperature of the mother liquor above 70° C.

5. The process of claim 4 wherein the sodium chromate crystals are separated from the mother liquor while the mother liquor is held at a temperature not substantially less than that at which the sodium chromate is crystallized.

6. The process of claim 3 wherein the sodium chromate crystals are separated from the mother liquor while the mother liquor is held at a temperature not substantially less than that at which the sodium chromate is crystallized.

7. A method of treating an aqueous solution of sodium chromate and sodium dichromate which contains 40 to 98 percent of its $CrO_3$ content as sodium dichromate which comprises concentrating the solution until part of the sodium chromate crystallizes out of solution and separating the resulting mother liquor from the crystals while holding the temperature of the mother liquor above 70° C., then cooling the mother liquor to crystallize out dichromate crystals and produce a second mother liquor which contains sodium chromate and sodium dichromate dissolved therein, and separating the dichromate crystals from the second mother liquor.

8. A method of treating an aqueous solution of sodium chromate and sodium dichromate which contains 40 to 98 percent of its $CrO_3$ content as sodium dichromate which comprises concentrating the solution until part of the sodium chromate crystallizes out of solution and separating the resulting mother liquor from the crystals while holding the temperature of the mother liquor above 70° C., then cooling the mother liquor to a temperature below 40° C. to crystallize out dichromate crystals and produce a second mother liquor which contains sodium chromate and sodium dichromate dissolved therein, and separating the dichromate crystals from the second mother liquor.

9. A method of treating an aqueous solution of sodium chromate and sodium dichromate which contains 40 to 98 percent of its $CrO_3$ content as sodium dichromate which comprises concentrating the solution until the composition of the resulting mixture is to the left of the graph shown in the drawing and the temperature is above 50° C. and until part of the sodium chromate crystallizes out of solution thereby producing a mixture of solid sodium chromate with an aqueous solution of sodium chromate and sodium dichromate, separating the resulting mother liquor from the crystals while holding the temperature of the mother liquor above 50° C., thereafter cooling the mother liquor to crystallize sodium dichromate crystals and produce a second mother liquor which contains sodium chromate and sodium dichromate dissolved therein, and separating the dichromate crystals from the second mother liquor.

10. The process of claim 9 wherein the temperature of the solution from which the sodium chromate crystallizes out is held above 70° C.

11. The process of claim 3 wherein the temperature of the solution during separation of mother liquor from the sodium chromate crystals is held at 70 to 125° C.

12. A method of recovering sodium chromate and preparing sodium dichromate which comprises reacting carbon dioxide with an aqueous solution of sodium chromate and thereby producing an aqueous solution of sodium chromate and sodium dichromate which contains 40 to 98 percent of its $CrO_3$ content as sodium dichromate, concentrating the solution until part of the sodium chromate crystallizes out of solution, separating the mother liquor from the crystals while holding the temperature of the mother liquor above 70° C., then cooling the mother liquor to crystallize out sodium dichromate crystals and produce a second mother liquor which contains sodium chromate and sodium dichromate dissolved therein, and separating the dichromate crystals from the second mother liquor.

13. The process of claim 12 wherein the second mother liquor is mixed with further sodium chromate solution and the resulting mixture is reacted with carbon dioxide to generate further sodium dichromate.

14. The process of claim 12 wherein the sodium chromate crystals are removed from the mother liquor while holding the temperature of the mother liquor at 70 to 125° C.

References Cited in the file of this patent

UNITED STATES PATENTS

| | | |
|---|---|---|
| 2,027,477 | Hackhofer | Jan. 14, 1936 |
| 2,931,704 | Hoekje | Apr. 5, 1960 |

OTHER REFERENCES

Mellor: Comprehensive Treatise on Inorganic and Theoretical Chemistry, 1931, vol. 11, pages 246 and 247.

UNITED STATES PATENT OFFICE
CERTIFICATE OF CORRECTION

Patent No. 3,027,245                 March 27, 1962

Robert A. Kearley

It is hereby certified that error appears in the above numbered patent requiring correction and that the said Letters Patent should read as corrected below.

Column 2, line 6, for "chomate-" read -- chromate- --; same column 2, line 19, for "stronge" read -- strong --; column 3, line 23, for "at" read -- to --; same column 3, line 45, for "4.088" read -- 4,088 --.

Signed and sealed this 30th day of October 1962.

(SEAL)
Attest:

ERNEST W. SWIDER
Attesting Officer

DAVID L. LADD
Commissioner of Patents